United States Patent
Rios et al.

(10) Patent No.: US 12,227,140 B2
(45) Date of Patent: Feb. 18, 2025

(54) ANCHORLESS TETHER FOR CURTAIN AIRBAG

(71) Applicant: ZF Passive Safety Systems US Inc., Washington, MI (US)

(72) Inventors: Fernando Rios, Chihuahua (MX); David Loya Cano, Chihuahua (MX)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 0 days.

(21) Appl. No.: 18/038,036

(22) PCT Filed: Nov. 22, 2021

(86) PCT No.: PCT/US2021/060238
§ 371 (c)(1),
(2) Date: May 22, 2023

(87) PCT Pub. No.: WO2022/115342
PCT Pub. Date: Jun. 2, 2022

(65) Prior Publication Data
US 2024/0001884 A1    Jan. 4, 2024

Related U.S. Application Data

(60) Provisional application No. 63/118,027, filed on Nov. 25, 2020.

(51) Int. Cl.
*B60R 21/232* (2011.01)
*B60R 21/213* (2011.01)
*B60R 21/2338* (2011.01)

(52) U.S. Cl.
CPC .......... *B60R 21/232* (2013.01); *B60R 21/213* (2013.01); *B60R 21/2338* (2013.01); *B60R 2021/23386* (2013.01)

(58) Field of Classification Search
CPC ........ B60R 2021/23386; B60R 21/213; B60R 21/232; B60R 21/2338
See application file for complete search history.

(56) References Cited

U.S. PATENT DOCUMENTS

| | | | |
|---|---|---|---|
| 6,874,208 B2* | 4/2005 | Wong | B60R 21/2338 24/265 AL |
| 7,168,735 B2* | 1/2007 | Kino | B60R 21/232 280/730.2 |

(Continued)

FOREIGN PATENT DOCUMENTS

| CA | 397312 A | 6/1941 |
|---|---|---|
| JP | 5588980 B2 | 9/2014 |

OTHER PUBLICATIONS

PCT Search Report for corresponding International Application Serial No. PCT/US2021/060238, mailed Feb. 24, 2022, pp. 1-2.

*Primary Examiner* — Laura Freedman
(74) *Attorney, Agent, or Firm* — Tarolli, Sundheim, Covell & Tummino LLP

(57) ABSTRACT

An apparatus for helping to protect an occupant of a vehicle includes a curtain airbag inflatable from a stored condition adjacent a roof of the vehicle to a deployed condition in which the curtain airbag is positioned between a side structure of the vehicle and the vehicle occupant. The apparatus also includes a tether for anchoring the curtain airbag to the vehicle structure. The tether includes a length of woven fabric material having longitudinal slits spaced from each other along the length of the tether. The tether is doubled over onto itself to position the slits overlying each other and to form a loop at the terminal end of the tether. A fastener extends through the aligned slits and being configured to connect the tether directly to the sheet metal of the vehicle.

12 Claims, 3 Drawing Sheets

(56) References Cited

U.S. PATENT DOCUMENTS

| | | | | |
|---|---|---|---|---|
| 7,571,930 | B2* | 8/2009 | Osterhout | B60R 21/233 |
| | | | | 280/730.2 |
| 8,196,952 | B2* | 6/2012 | Walston | B60R 21/2171 |
| | | | | 280/730.2 |
| 9,272,682 | B2* | 3/2016 | Wang | B60R 21/232 |
| 10,723,303 | B2* | 7/2020 | Hioda | B60R 21/216 |
| 11,260,821 | B2* | 3/2022 | Valles Rey | B60R 21/232 |
| 11,279,310 | B1* | 3/2022 | Uribe | B60R 21/237 |
| 11,697,387 | B2* | 7/2023 | Fernandes Oliveira | |
| | | | | B60R 21/2338 |
| | | | | 280/728.2 |
| 2005/0011057 | A1* | 1/2005 | Dominssini | B60R 21/2338 |
| | | | | 24/570 |
| 2018/0208146 | A1* | 7/2018 | Azuma | B60R 21/237 |
| 2020/0282945 | A1 | 9/2020 | McKeon | |

* cited by examiner

ANCHORLESS TETHER FOR CURTAIN AIRBAG

RELATED APPLICATION

This application claims the benefit of U.S. Provisional Application Ser. No. 63/118,027, which was filed on Nov. 25, 2020, the subject matter of which is hereby incorporated by reference in its entirety.

TECHNICAL FIELD

The invention relates to an apparatus for helping to protect an occupant of a vehicle. More particularly, the invention relates to a curtain airbag that is inflatable between a vehicle occupant and a side structure of a vehicle.

BACKGROUND

It is known to inflate an inflatable vehicle occupant protection device to help protect a vehicle occupant in the event of a vehicle collision. One particular type of inflatable vehicle occupant protection device is a curtain airbag that is fixed to the roof of the vehicle and/or to a support structure adjacent to the roof of the vehicle. The curtain airbag is configured to inflate from the roof of the vehicle downward inside the passenger compartment in the event of a side impact or a vehicle rollover. The curtain airbag, when inflated, is positioned between a vehicle occupant and the side structure of the vehicle and helps to protect the vehicle occupant from impacting the side structure and from being ejected from the vehicle.

Tethers can be used to anchor the curtain airbag to the vehicle in order to maintain proper positioning and to prevent the vehicle occupants from moving outside the vehicle through side window openings. Because the forces exerted on these tethers can be high, hardware, such as anchor brackets, can be used to secure the tethers to the vehicle structure. Anchor brackets provide a secure, highly reliable fixation to structure, e.g., sheet metal, of the vehicle by a fastener, such as a bolt. At the same time, the bracket facilitates a connection with the tether, such as a tied knot connection, a lasso connection, or a looped and stitched connection to the bracket, that is strong, robust, and not prone to tearing or cutting. To facilitate this, the anchor bracket can have a stamped construction with a tether receiving eyelet to which the tether can be connected, and a fastener receiving aperture through which the fastener can extend.

From a manufacturing and installation standpoint, producing the tether and bracket, assembling (i.e., connecting) the curtain airbag tether with the anchor bracket, and installing the bracket with the tether attached in the vehicle is a complicated, time consuming, and expensive process, relatively speaking. The anchor brackets must be manufactured, which requires specialized tooling, such as stamps or die-cutters, and post processing treatments, such as anti-corrosion coatings. The tethers then need to be connected to the bracket prior to installation of the curtain airbag module in the vehicle. This may entail looping the tether through the bracket and stitching the tether onto itself to form a loop. If the curtain airbag has a one-piece woven (OPW) construction, the tether may be formed as a contiguous extension of the airbag material. This means that the looping and sewing operation requires handling of the entire curtain airbag. From this, those skilled in the art will appreciate that the implementation of a curtain airbag tether using an anchor bracket adds significant complexity to the manufacture and installation of the curtain airbag module.

SUMMARY

According to one aspect, a tether configuration for a curtain airbag avoids the need for an anchor bracket for connecting the tether to the vehicle. The tether has a construction that permits the tether to be anchored directly to the vehicle by a threaded fastener, such as a bolt or screw. The fastener can be screwed into the vehicle sheet metal itself or a stud welded to the sheet metal.

According to one aspect, an apparatus for helping to protect an occupant of a vehicle includes a curtain airbag inflatable from a stored condition adjacent a roof of the vehicle to a deployed condition in which the curtain airbag is positioned between a side structure of the vehicle and the vehicle occupant. The apparatus also includes a tether for anchoring the curtain airbag to the vehicle structure. The tether includes a length of woven fabric material having longitudinal slits spaced from each other along the length of the tether. The tether is doubled over onto itself to position the slits overlying each other and to form a loop at the terminal end of the tether. A fastener extends through the aligned slits and being configured to connect the tether directly to the sheet metal of the vehicle.

According to another aspect, the slits can be centered across a width of the tether.

According to another aspect, the tether can be formed separately from the airbag and stitched to the airbag.

According to another aspect, the doubled over portions of the tether are free from interconnections.

According to another aspect, the apparatus can also include a retainer washer fitted over a portion of a shaft of the fastener that protruding from the doubled-over tether on a side opposite a head of the fastener. The retainer washer can securing the fastener onto the tether to form an assembly that can be packaged and shipped as a unit with a curtain airbag module for installation without requiring assembly.

According to another aspect, the fastener can be a flange bolt that includes a flange surface for engaging the tether. The flange surface can have a diameter that meets or exceeds the width of the tether.

According to another aspect, the width of the tether can be 10 millimeters. According to this aspect, the lengths of the slits can be 10 millimeters and the slits can be spaced 40 millimeters apart.

According to another aspect, the tether can be constructed of a polyester material. Alternatively, the tether can be constructed of a PET (polyethylene terephthalate) polyester material.

According to another aspect, the weight of the tether material can be about 13 grams per meter.

According to another aspect, the curtain airbag, tether, and fastener can be packaged along with an inflator for providing inflation fluid for inflating the curtain airbag to form the airbag module for installation in the vehicle as a unit. The airbag module can form a portion of a vehicle safety system.

DESCRIPTION

Figure 1:
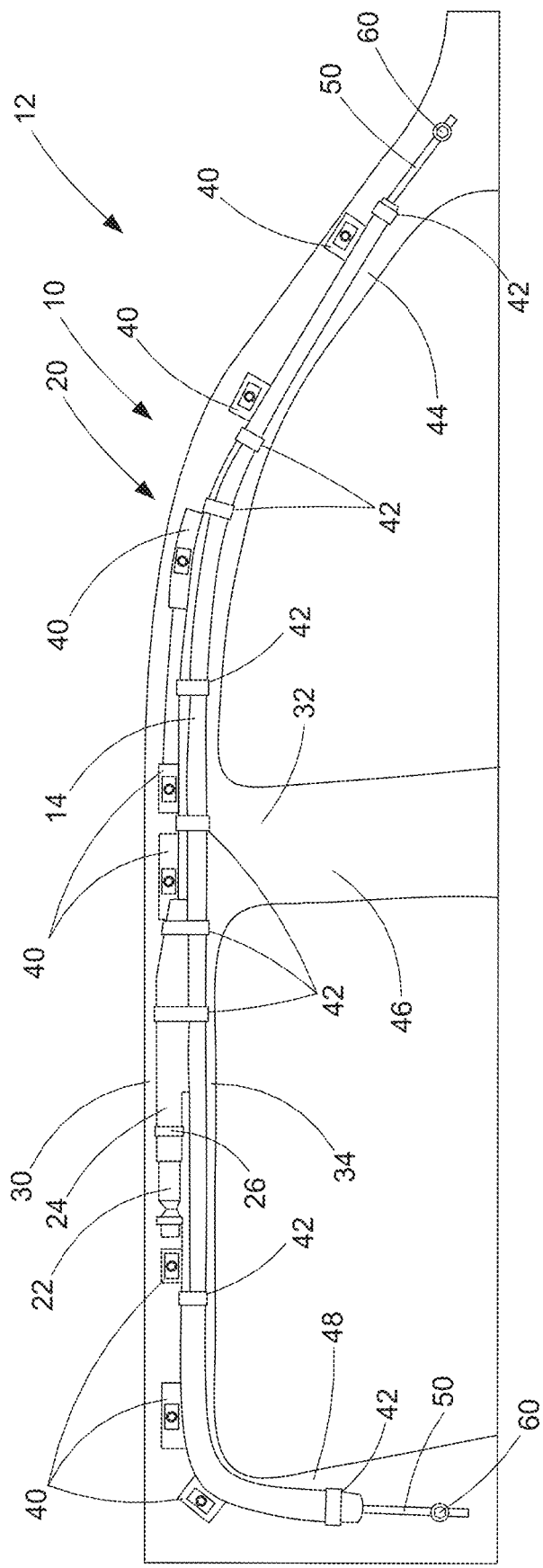
FIG. 1 is a schematic view of an airbag module installed in a vehicle.

An apparatus 10 for helping to protect an occupant of a vehicle 12 includes an inflatable vehicle occupant protection device in the form of a curtain airbag 14 for helping to protect occupants in the event of a side impact to the vehicle. The curtain airbag 14 can be installed on a driver side or passenger side of the vehicle 12 and can cover a desired portion of the vehicle side structure 32. The curtain airbag 14 can, for example, extend from an A pillar 44 to a C pillar 48 of the vehicle 12 and can cover portions of the A pillar, C pillar and a B pillar 46 of the vehicle.

The curtain airbag 14 can have various constructions. The curtain airbag 14 includes panels of material that are arranged in an overlying manner. Overlapping portions of the panels are interconnected along at least a portion of a perimeter of the curtain airbag 14 to help define an inflatable volume of the curtain airbag. The curtain airbag 14 can also include interior seams in which the overlying panels are interconnected within the perimeter to form non-inflatable portions that help define inflatable chambers of the curtain airbag.

The curtain airbag 14 can be constructed of any suitable material, such as nylon (e.g., woven nylon 6-6 yarns), and can be constructed in any suitable manner. For example, the curtain airbag 14 may have a one-piece woven (OPW) construction in which the overlying panels are woven simultaneously as a single piece of material. As another example, the overlying panels can be formed from separate pieces of material that are interconnected by known means, such as stitching, ultrasonic welding, heat bonding, or adhesives, to form the curtain airbag 14. The curtain airbag 14 can be uncoated, coated with a material, such as a gas impermeable urethane, or laminated with a material, such as a gas impermeable film. The curtain airbag 14 thus can have a gas-tight or substantially gas-tight construction. Those skilled in the art will appreciate that alternative materials, such as polyester yarn, and alternatives coatings, such as silicone, can also be used to construct the curtain airbag.

The curtain airbag 14 can be a part of an airbag module 20 that includes an inflator 22 operably connected in fluid communication with the inflatable volume of the curtain airbag. The curtain airbag 14 can, for example, have an inflator mouth 24 configured to receive and secured to the inflator, e.g., via a clamp 26. The inflator 22 is actuatable to provide inflation fluid to the inflatable volume of the curtain airbag 14 to inflate and deploy the curtain airbag. The inflator 22 can be of any known type, such as stored gas, solid propellant, augmented, or hybrid. An airbag controller (not shown) can be operatively connected to the inflator 22 via lead wires. The airbag controller is configured to actuate the inflator 22 in response to sensing the occurrence of an event for which occupant protection is desired, such as a collision.

The airbag module 20 can be installed in the vehicle 12 as a unit. To install the airbag module 20 in the vehicle 12, the curtain airbag 14 is deflated, flattened, rolled and/or folded, and packaged for installation. By "packaged," it is meant that the curtain airbag 14 is maintained in the rolled and/or folded condition so that the curtain airbag and certain associated components, such as the inflator 22, fill tubes, connectors, installation brackets, etc., can be installed in the vehicle 12 as a unit. Reference to the "packaged curtain airbag," "the curtain airbag package," and the like means a curtain airbag that is maintained in the rolled and/or folded condition so that the curtain airbag and the other components of the package are in a ready-to-install condition.

When installed in the vehicle, the airbag module 20 can be mounted adjacent the vehicle roof 30 and/or the vehicle side structure 32 in any known manner. In the packaged condition, the curtain airbag 14, i.e., airbag module 20, is mounted to the vehicle 12 at or near the intersection of the side structure 32 of the vehicle and the vehicle roof 30. This structure can be referred to as the roof rail 34. In the installed condition, the airbag module 20 including the packaged curtain airbag 14 is positioned between a vehicle headliner (now shown) and the roof 30/side structure 32/roof rail 34.

Those skilled in the art will recognize that the configuration of the vehicle structure, and thus the spatial and interconnecting relationships between the vehicle structure (i.e., the vehicle side structure 32, the vehicle roof 30, and the vehicle roof rail 34), the headliner and trim pieces (not shown), and the airbag module 20, can vary depending upon the particular vehicle platform for which the airbag module is designed.

Upon the occurrence of an event for which occupant protection is desired, such as a collision, the airbag controller actuates the inflator 22 to provide inflation fluid to the inflatable volume of the curtain airbag 14 to inflate and deploy the curtain airbag from the stored condition to a deployed condition. The deploying curtain airbag deploys downward away from the vehicle roof 30 to the deployed condition, extending along the vehicle side structure 32 and positioned between the vehicle side structure and the vehicle occupant(s).

To help ensure that the curtain airbag deploys to a desired position configured to promote or maximize the degree of protection afforded to the occupant(s), the curtain airbag should deploy inboard of the vehicle side structure (i.e., in the passenger compartment). For this purpose, tethers are used to anchor the curtain airbag to the vehicle.

FIG. 1 illustrates by way of example a curtain airbag module 20 installed in a vehicle 12. As shown in FIG. 1, the curtain airbag module 20 is installed on the vehicle roof rail 34 at or near the intersection of the side structure 32 and the roof 30. Mounting tabs 40 spaced along the length of the curtain airbag module 20 are used to secure the module to the vehicle sheet metal. The mounting tabs 40 can be portions of the curtain airbag 14 spaced along an upper edge of the airbag. Airbag wraps 42 maintain the curtain airbag 14 in the rolled and/or folded condition.

Anchor tethers 50 secure the front and rear ends of the curtain airbag 14 to the vehicle 12 at anchor points. As shown in detail in FIGS. 2 and 3, the anchor points 60 can be points in/on the vehicle sheet metal 80 where the anchor tethers 50 are secured. The anchor tether 50 is looped or doubled over to form a two layer tether section 52, with first and second portions 54, 56, respectively, positioned overlying each. At each anchor point, a fastener 62 extends through the two layers of the two layer tether section 52 and into the sheet metal 80 to connect the tether 50 to the vehicle 12. The fastener 62 can be a threaded fastener, such as a screw or bolt, that threads directly into the sheet metal and forms a threaded engagement with the sheet metal. In this instance, the fastener 62 can be a sheet metal screw. Alternatively, the fastener 62 could engage a threaded stud that is welded to the sheet metal 80.

Figure 2:
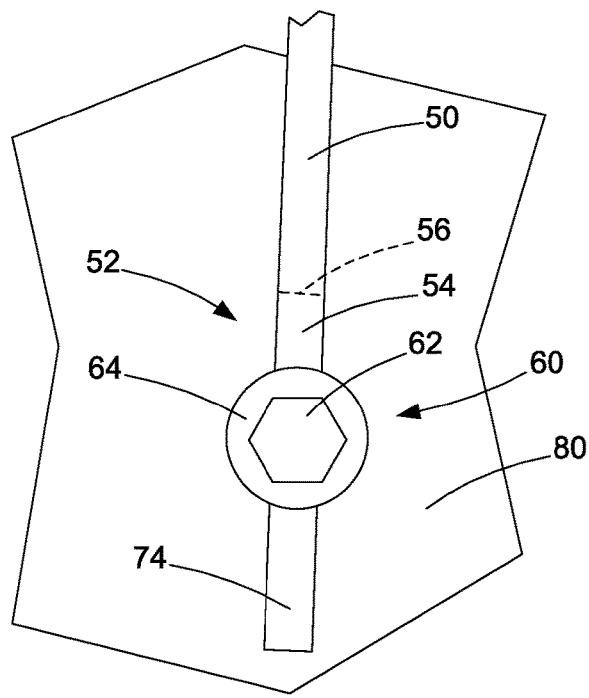
FIG. 2 is an enlarged schematic view of a portion of the airbag module including an anchor tether and a fastener for connecting the anchor tether to the vehicle.
Figure 3:
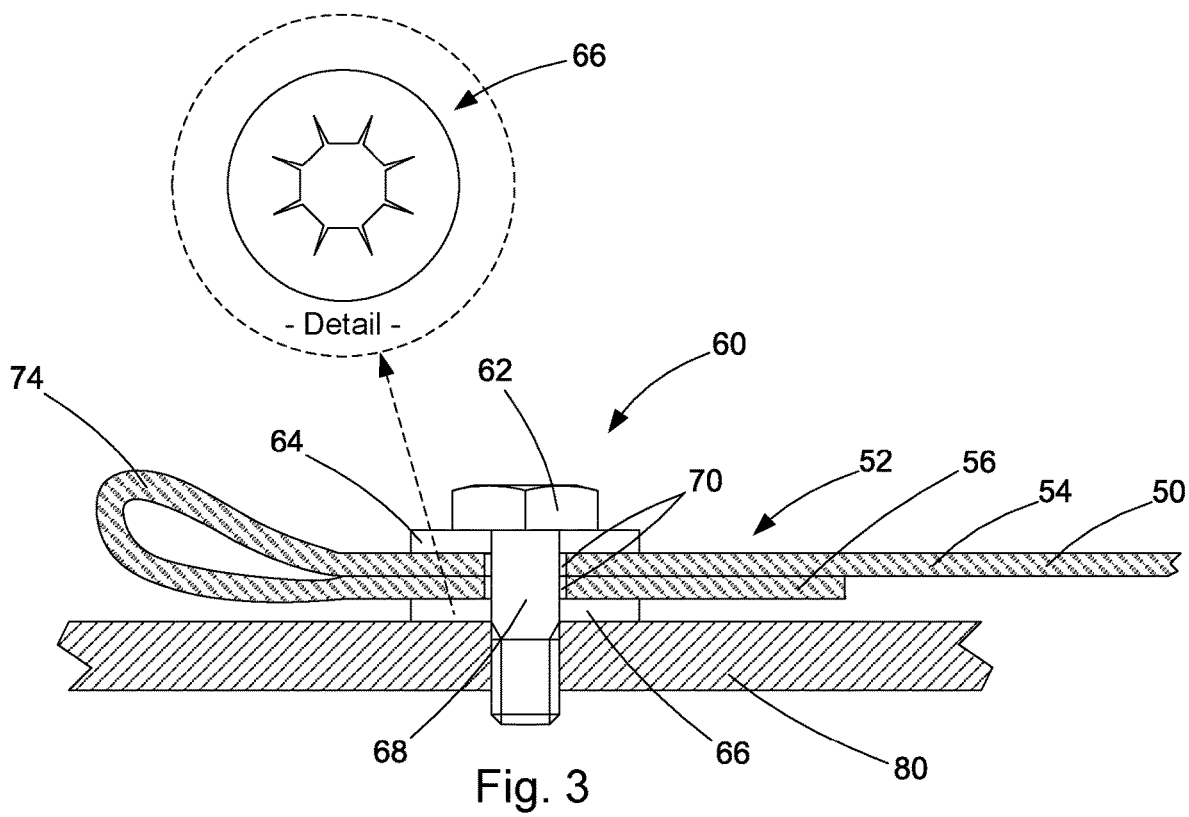
FIG. 3 is a schematic side view of the portion of the airbag module illustrated in FIG. 2, illustrating the connection of the anchor tether to the vehicle.

As shown in FIGS. 2 and 3, the fastener 62 can also extends through a top washer 64 and a bottom washer 66 on opposite sides of the doubled over two layer tether section 52. In one example configuration, the fastener can be a flange bolt or flange screw, which can eliminate the need for a separate top washer, as the flange has the same general configuration of the top washer 64, as shown. As shown in the detail portion of FIG. 3, the bottom washer 66 can be a retaining washer with teeth on the inside diameter that "grab" onto the threaded fastener shaft.

Figure 4A:
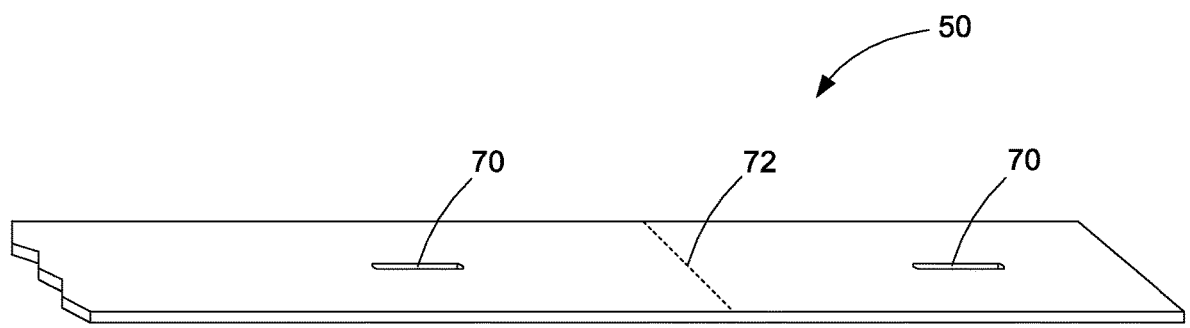
FIGS. 4A and 4B are schematic views illustrating the configuration of the anchor tether.
Figure 4B:
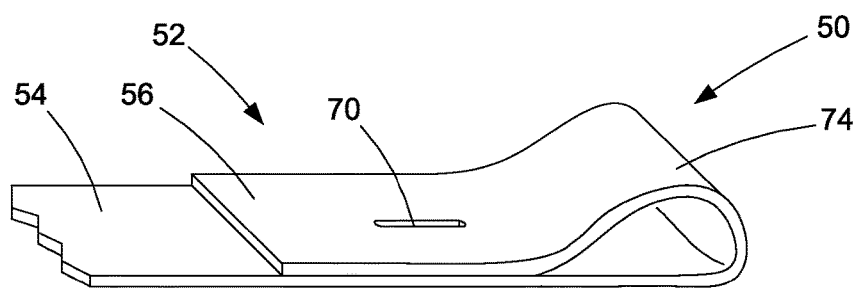

The construction of the anchor tether 50 is shown in FIGS. 4A and 4B. The anchor tether 50 is manufactured separately and connected to the curtain airbag by means, such as stitching. As shown in FIG. 4A, fastener slits 70 extending through the anchor tether 50 are spaced equidistantly from an imaginary fold line 72. Once the slits 70 are formed, the anchor tether 50 is folded generally about the fold line 72, which positions the tether portions 54, 56 overlying each other, creating the doubled over two layer tether section 52 with the aligned fastener slits 70 overlying each other. With the tether 50 doubled over in this manner, the fastener 60 can be extended through the aligned fastener slits 70, as shown in the detailed view of FIG. 3.

Advantageously, where the bottom washer 66 is a retaining washer, the retention of the bottom washer on the fastener shaft 68 can retain the fastener 60 and washer(s) 64, 66 in the aligned fastener slits 70 and can maintain the anchor tether 50 in the doubled over condition. The anchor tether 50, fastener 60, and washers 64, 66 thereby form an assembly that can be maintained and shipped as an installation-ready unit. When it is time to install the curtain airbag module in the vehicle, no assembly is required; the fasteners are simply installed in the vehicle, e.g., screwed into the vehicle sheet metal 80.

The configuration of the anchor tether 50 disclosed herein overcomes drawbacks of using anchor brackets to connect curtain airbag tethers to the vehicle. Anchor brackets were designed to maximize the performance of prior anchor tether designs by preventing them from damage during use. The stamped or otherwise formed anchor brackets implement smooth, rounded surfaces that engage the tether at the anchor point in the vehicle. This smooth, rounded engagement with the tether eliminates engagement of the anchor tether with sharp corners that could damage the tether material. This also prevents harsh, abrupt bends in the tether, which reduce abrasion and areas of focused stress in the anchor tether that could lead to tether failure.

Additionally, anchor brackets can be configured to maximize the contact area of the tether with the bracket, which helps reduce stresses on the tether by spreading forces over a larger area of the tether. This can be done, for example, by configuring the anchor bracket so that the tether extends around and over a large radius (as opposed to small radius) curved engagement surface of the anchor bracket, which distributes forces over a larger area of the tether.

For the subject invention, to retain a high-strength, reliable functioning of the anchor tether 50 despite the absence of an anchor bracket for securing the tether to the vehicle, several features are implemented in its design. First, the anchor tether 50 is constructed of a woven material that is slightly heavier in weight than the woven curtain airbag material. While both the curtain airbag and the tether can be constructed of the same type of material, in the present case a polyester material, such as PET (polyethylene terephthalate), the weight of the anchor tether material can be slightly higher (e.g., about 13 grams/meter) than the curtain airbag material (e.g., about 12.5 grams/meter).

Additionally, the fastener slits 70 are precision cut using a laser cutting process that centers the slits widthwise on the tether 50, ensures that the slits extend parallel to the length of the tether, and have precise lengths, which are equal to each other. Significantly, the laser cutting process melts the ends of the warp and weft yarns of the tether material together, which prevents fraying and unravelling of the yarns. The melting produced by laser welding is consistent and uniform, which lends to the ability of the tether 50, held only by the fastener 62 and washer(s) 64, 66, to anchor the curtain airbag 14 in the vehicle 12. Because the tethers 50 are connected to the vehicle 12 using only the fastener 62 and washer(s) 64, 66, the contact area of the tether with the anchoring surface is limited to the diameter of the fastener/washer(s). Configuring the anchor tether such that the looped end extends a substantial length from the overlying slits creates ample length to prevent tether failure at the distal ends of the slits.

Laser cutting requires specialized equipment and therefore can be costly. Another option for cutting the fastener slits 70 can be the use of a hot knife. Hot knives, however, do not produce the fastener slits 70 with a high degree of precision, as the slits are not as uniformly formed, and the melting together of the yarns is not as uniform and consistent as those produced by laser cutting. Therefore, to implement a hot knife cut anchor tether can require a higher strength and/or weight material to account for manufacturing inconsistencies. The higher strength material cost of a knife cut configuration would need to be balanced against the higher equipment cost associated with a laser cut configuration.

Advantageously, since the anchor tether 50 implements a folded over design with the fastener 62 extending through the overlying slits 70, there is no need to stitch the tether onto itself to maintain the two-layer section 52, as is the case with anchor bracket installations. The anchor tether 50 disclosed herein therefore eliminates the need for the equipment and processes necessary for mass production, such as sewing plates, operators, space in the assembly line, maintenance, spare parts, etc. In fact, the fact that the overlying portions 54, 56 are not interconnected by stitching or any other means is advantageous in terms of the effectiveness of the anchor tether 50.

This is because the anchor tether 50 does not rely on the loop 74 to secure the tether to the vehicle 12. Instead, the anchor tether 50 relies on the clamping force of the fastener 62 and the washer(s) 64, 66 for this connection. It is this structure that enables the anchor tether 50 to be free from stitching or other connections for maintaining the folded-over, looped configuration of the two layer portion 52. Because of this, tension on the anchor tether 50 is applied to the first portion 54 only. This changes the dynamics of how loads are managed by the tether.

The first portion 54 is positioned overlying the second portion 56, and the two portions are clamped between the washers 64, 66 by the fastener 62. The second portion 56 helps form a protective barrier between the first portion 54 and the vehicle sheet metal 80 at the anchor point 60. Tension on the anchor tether 50 is therefore borne by the part of the first portion 54 that is impinged between the washers 64, 66. If tension on the anchor tether 50 overcomes this clamped connection, the tether material adjacent the slit 70 in the first portion 54 engages the fastener 62, which then bears a portion of the load. If tension on the tether 50 overcomes this additional connection, the slit 70 can rupture, tearing further lengthwise, as opposed to tearing completely. This allows the tether 50 to absorb the tension load, as opposed to tearing completely and releasing the connection.

The looped, unconnected/unstitched configuration of the anchor tether 50 provides this functionality. If not for the inclusion of the loop 74, which positions the portions 54, 56 overlying each other, and if not for the unconnected configuration of the overlying portions, the anchor tether 50 would not perform in this manner, absorbing loads and avoiding failure. The unconnected nature of the overlying tether portions 54, 56 allows for relative movement between those portions which, in turn, allows the slit 70 of the first portion to dissipate forces in the event that forces on the tether overcome the clamped connection. This dissipation allows the tether 50 to avoid rupture and maintain the connection between the curtain airbag 14 and the vehicle 12.

Tension testing has shown that the anchor tether 50, having the doubled over construction with the overlying laser cut slits and the fastener/washer(s) secured directly to the vehicle sheet metal improves the strength with which the tether can anchor the curtain airbag to the vehicle. Testing of a 10 mm wide anchor tether with 10 mm slits spaced 40 mm apart, constructed of the 13 g/m polyester, and installed with a flange bolt and retainer washer combination torqued to 9 Nm produced improved tether strength. The recorded tension at failure for this configuration was about 2420 N, an almost 1000 N improvement over an identical configuration using the 12.5 g/m curtain airbag material. The resulting strength was found to exceed performance requirements for the tether.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for helping to protect an occupant of a vehicle, comprising:
    a curtain airbag inflatable from a stored condition adjacent a roof of the vehicle to a deployed condition in which the curtain airbag is configured to be positioned between a side structure of the vehicle and the vehicle occupant; and
    a tether for anchoring the curtain airbag to the vehicle structure, the tether comprising a length of woven fabric material having longitudinal slits spaced from each other along the length of the tether, the tether being doubled over onto itself to position the slits overlying each other and to form a loop at a terminal end of the tether; and
    a fastener extending through the slits and being configured to connect the tether directly to sheet metal of the vehicle, wherein the fastener comprises a flange bolt that includes a flange surface for engaging the tether, wherein the flange surface has a diameter that meets or exceeds a width of the tether.

2. The apparatus recited in claim 1, wherein the slits are centered across a width of the tether.

3. The apparatus recited in claim 1, wherein the tether is formed separately from the airbag and stitched to the airbag.

4. The apparatus recited in claim 1, wherein the doubled over portions of the tether are free from interconnections.

5. The apparatus recited in claim 1, further comprising a retainer washer fitted over a portion of a shaft of the fastener that protrudes from the doubled-over tether on a side opposite a head of the fastener, the retainer washer securing the fastener onto the tether to form an assembly that can be packaged and shipped as a unit with a curtain airbag module for installation without requiring assembly.

6. The apparatus recited in claim 1, wherein the width of the tether is 10 millimeters.

7. The apparatus recited in claim 6, wherein the slits are 10 millimeters in length and the slits are spaced 40 millimeters apart.

8. The apparatus recited in claim 1, wherein the tether is constructed of a polyester material.

9. The apparatus recited in claim 8, wherein the tether is constructed of a PET (polyethylene terephthalate) polyester material.

10. The apparatus recited in claim 8, wherein the tether material has a weight of about 13 grams per meter.

11. An airbag module comprising:
    the apparatus recited in claim 1; and
    an inflator for providing inflation fluid for inflating the curtain airbag, wherein the curtain airbag, inflator, tether, and fastener are packaged to form the airbag module for installation in the vehicle as a unit.

12. A vehicle safety system comprising the airbag module of claim 11.

* * * * *